United States Patent
Gibson et al.

(10) Patent No.: US 11,377,200 B2
(45) Date of Patent: Jul. 5, 2022

(54) APPARATUS AND METHOD FOR PILOTING AN AIRCRAFT

(71) Applicant: Bell Textron Inc., Fort Worth, TX (US)

(72) Inventors: James Gibson, Heath, TX (US); Carey Cannon, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 118 days.

(21) Appl. No.: 16/733,798

(22) Filed: Jan. 3, 2020

(65) Prior Publication Data
US 2020/0216164 A1 Jul. 9, 2020

Related U.S. Application Data

(60) Provisional application No. 62/788,142, filed on Jan. 4, 2019.

(51) Int. Cl.
*B64C 13/04* (2006.01)

(52) U.S. Cl.
CPC ................................ *B64C 13/0421* (2018.01)

(58) Field of Classification Search
CPC .............. B64C 13/0421; B64C 13/042; B64C 13/0423
See application file for complete search history.

(56) References Cited

U.S. PATENT DOCUMENTS

| | | | |
|---|---|---|---|
| 9,898,033 B1 * | 2/2018 | Long | G05G 5/05 |
| 10,144,504 B1 * | 12/2018 | Selwa | G05G 9/047 |
| 2009/0187292 A1 * | 7/2009 | Hreha | B64C 13/0423 701/4 |
| 2020/0333805 A1 * | 10/2020 | English | B64C 29/0033 |

* cited by examiner

*Primary Examiner* — Rodney A Bonnette
(74) *Attorney, Agent, or Firm* — Lightfoot & Alford PLLC

(57) ABSTRACT

A control device for an aircraft has a control stick configured to be operated by hand of a user. The control stick is pivotable about a longitudinal axis, a lateral axis, and a yawing axis extending through the control stick. Motion of the stick about the longitudinal axis is configured to cause roll motion of the aircraft, motion of the stick about the lateral axis is configured to cause pitch motion of the aircraft, and motion of the stick about the yawing axis is configured to cause yaw motion of the aircraft. Rotation of a thumbwheel carried by the control stick changes a magnitude of a thrust vector of the aircraft.

3 Claims, 5 Drawing Sheets

APPARATUS AND METHOD FOR PILOTING AN AIRCRAFT

CROSS-REFERENCE TO RELATED APPLICATIONS

This application claims priority to U.S. Provisional Patent Application No. 62/788,142, filed on 4 Jan. 2019 by James Gibson, et al., and titled "Apparatus and Method for Piloting an Aircraft," the disclosure of which is incorporated by reference in its entirety.

STATEMENT REGARDING FEDERALLY SPONSORED RESEARCH OR DEVELOPMENT

Not applicable.

BACKGROUND

Typical aircraft hand-operated pilot controls fall into three groups, each of which is generally configured to control pitch and roll of the aircraft. For each of these systems, yaw is typically controlled with foot-operated pedals, whereas a separate throttle and/or collective is used to control thrust output.

FIG. 1 illustrates a floor-mounted stick system 101 that comprises a stick 103, pivotable about a lateral axis 105 and a longitudinal axis 107, and a grip 109 for the pilot to grasp. During use, stick 103 can be pivoted about axis 105 in forward direction 111 and in rearward direction 113 to control pitch, and stick 103 can be pivoted about axis 107 in right direction 115 and in left direction 117 to control roll. A housing 119 at the lower end of stick 103 comprises mechanisms, sensors, or other devices for converting motions of stick 103 into motions or electrical signals for use in operating control surfaces of the aircraft. Though shown as an elongated stick 103, which would typically be located between the legs of the pilot, stick 103 may be substantially shorter in length for use in other configurations, such as, for example, dash-mount or side-stick configurations.

FIG. 2 illustrates a floor-mounted yoke system 121 pivotable about a lateral axis 123 and rotatable about an axis 125 that is located above axis 123. A yoke 127 has opposing grips 129, 131 and is supported on a column 133 extending from housing 135. Housing 135 comprises mechanisms, sensors, or other devices for converting motions of yoke 127 and column 133 into motions or electrical signals for use in operating control surfaces of the aircraft. During use, yoke 127 can be pivoted about axis 125 in directions 137, 139 for controlling roll, and yoke 127 and column 133 can be pivoted together about axis 123 in directions 141, 143 for controlling pitch, axis 125 also rotating about axis 123.

FIG. 3 illustrates a dash-mounted yoke system 145 pivotable about a longitudinal axis 147 and translatable along axis 147. A yoke 149 has opposing grips 151, 153 and is supported on a shaft 155 extending from dash 157. Dash 157 comprises mechanisms, sensors, or other devices for converting motions of shaft 155 into motions or electrical signals for use in operating control surfaces of the aircraft. During use, yoke 149 and shaft 155 can be pivoted together about axis 147 in directions 159, 161 for controlling roll, and yoke 149 and shaft 155 can be translated together along axis 147 in directions 163 for controlling pitch.

DETAILED DESCRIPTION

Figure 1:
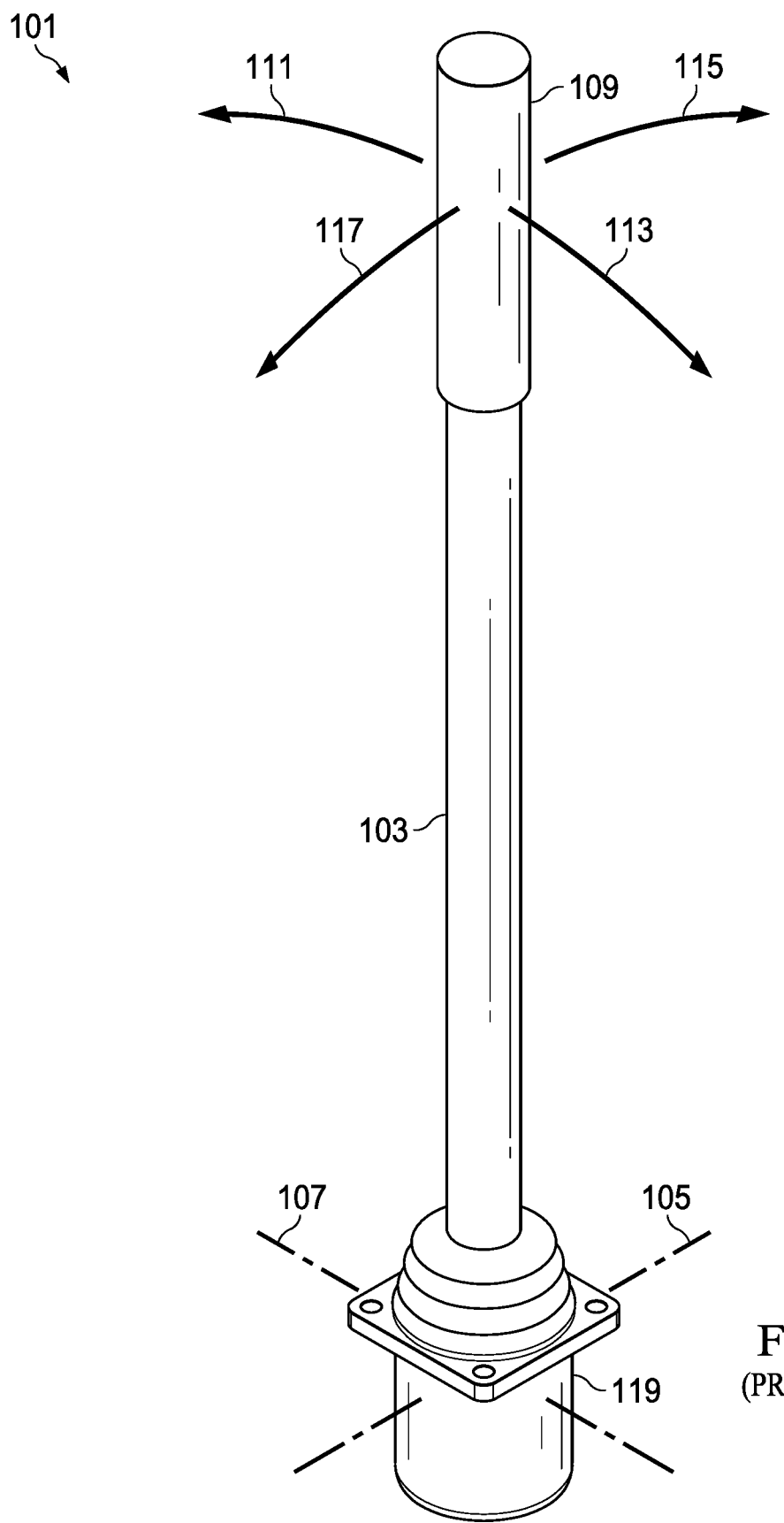
FIG. 1 is an oblique view of a prior-art aircraft control.
Figure 2:
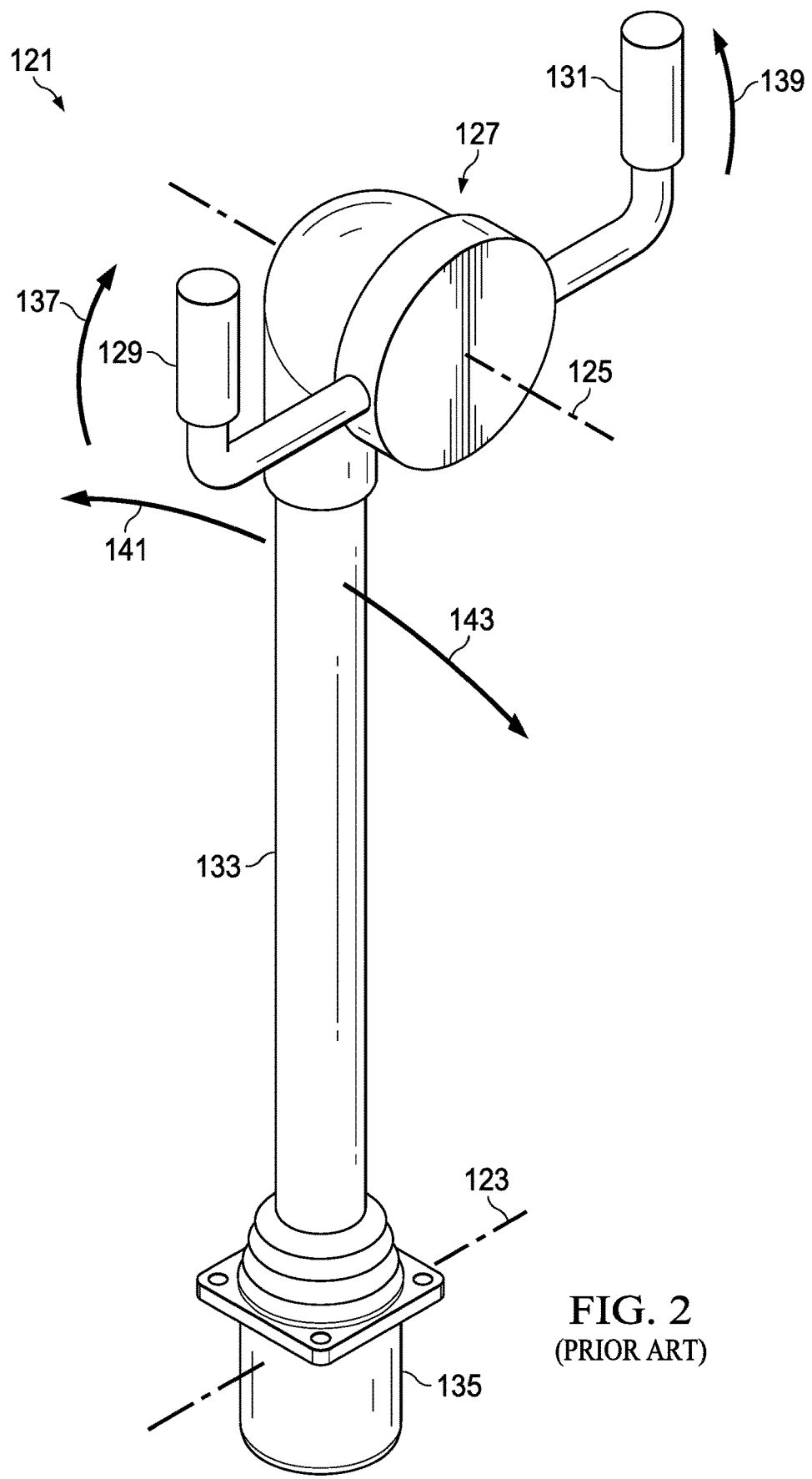
FIG. 2 is an oblique view of another prior-art aircraft control.
Figure 3:
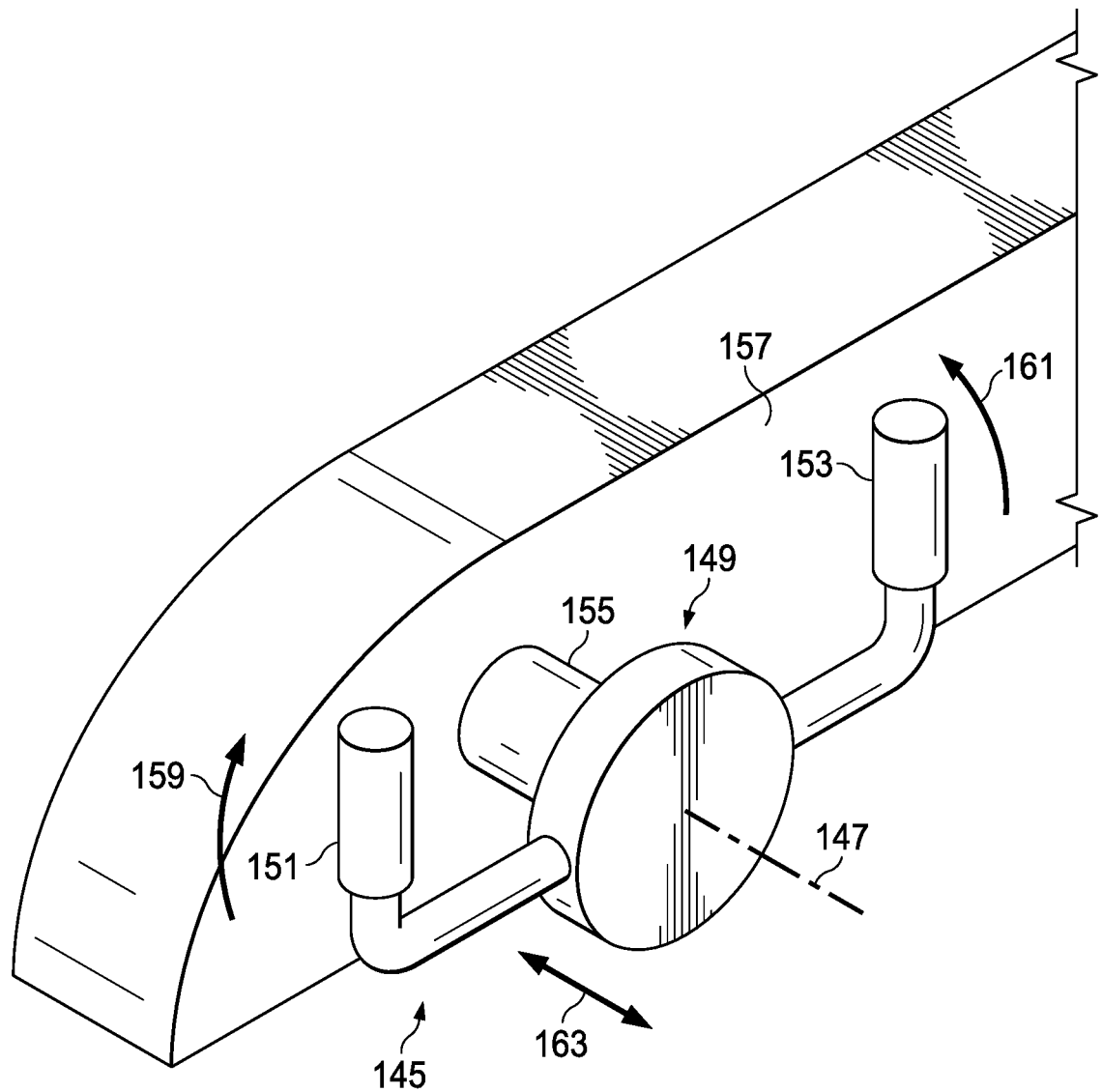
FIG. 3 is an oblique view of another prior-art aircraft control.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges a control-stick apparatus and methods for controlling an aircraft. The control stick provides for one-handed control of all degrees of freedom of the aircraft. In some embodiments, power or torque is controlled with a thumbwheel (or similar device) carried by the control stick to vary a magnitude of a thrust vector. The embodiments of the control stick may be configured for use with various types of aircraft, including, for example, fixed-wing, rotary-wing, and powered-lift (including, for example, tiltrotors, tiltwings, and aircraft using pivoting ducted fans or vectored thrust), all of which may be manned or unmanned.

FIGS. 4 through 7 illustrate embodiments of a control-stick system according to this disclosure. Systems 201, 301 are constructed and operated similarly, though the control outputs and methods of operating an aircraft differ.

A control stick 203 has a grip 205 shaped for grasping by a user (e.g., a pilot), a hand rest 207 below grip 205, a finger/thumb rest 209, and a head section 211 located above grip 205. In some embodiments a thumbwheel 213 is carried on face 215 of head section 211. Stick 203 is pivotably coupled via shaft 217 to housing 219, which comprises mechanisms, sensors, or other devices for converting motions of shaft 217 relative to housing 219 into electrical signals for use by a flight-control system (not shown). Alternatively, components of housing 219 can communicate motions of shaft 217 directly to electromechanical auxiliary components. In either case, motions of stick 203 or stick 203 and shaft 217 together can be used to operate one or more flight control devices, such as, for example, control surfaces of the aircraft and pitch controls for rotor blades, and for controlling a direction of at least a portion of the thrust produced by the aircraft. Rotational motion of thumbwheel 213 in the directions shown by arrow 220 changes power or torque (preferably linearly) for controlling the amount of thrust. A bellows 221 or similar flexible enclosure limits the amount of dust or other foreign objects entering housing 219.

Stick 203 and shaft 217 are pivotable together about lateral axis 222 in a forward direction indicated by arrow 223 and in a rearward direction indicated by arrow 225. Likewise, stick 203 and shaft 217 are pivotable together about longitudinal axis 227 in a right direction indicated by arrow 229 and in a left direction indicated by arrow 231.

Systems 201, 301 also provide for stick 203, stick 203 and shaft 217, or a portion of stick 203 to pivot about an axis 233 of shaft 217 in the directions indicated by arrows 235, 237. Axis 233 preferably extends generally through the center of grip 205, so as to allow rotation about the center of a hand grasping grip 205. Axis 233 is generally vertical in the rest position of stick 203, as shown in the figures, but it should be noted that axis 233 pivots with stick 203 and shaft 217 about axes 222, 227. Finger/thumb rest 209 is preferably helical and provides additional surface area for friction between rest 209 and the index finger and middle finger when grip 205 is grasped. In addition, rest 209 may provide for support of some of the weight of the hand. Though not shown, stick 203 may also, or alternatively, be divided into sections (for example, upper and lower sections) for relative movement between the sections about a lateral or longitudinal axis or axis 233.

Figure 4:
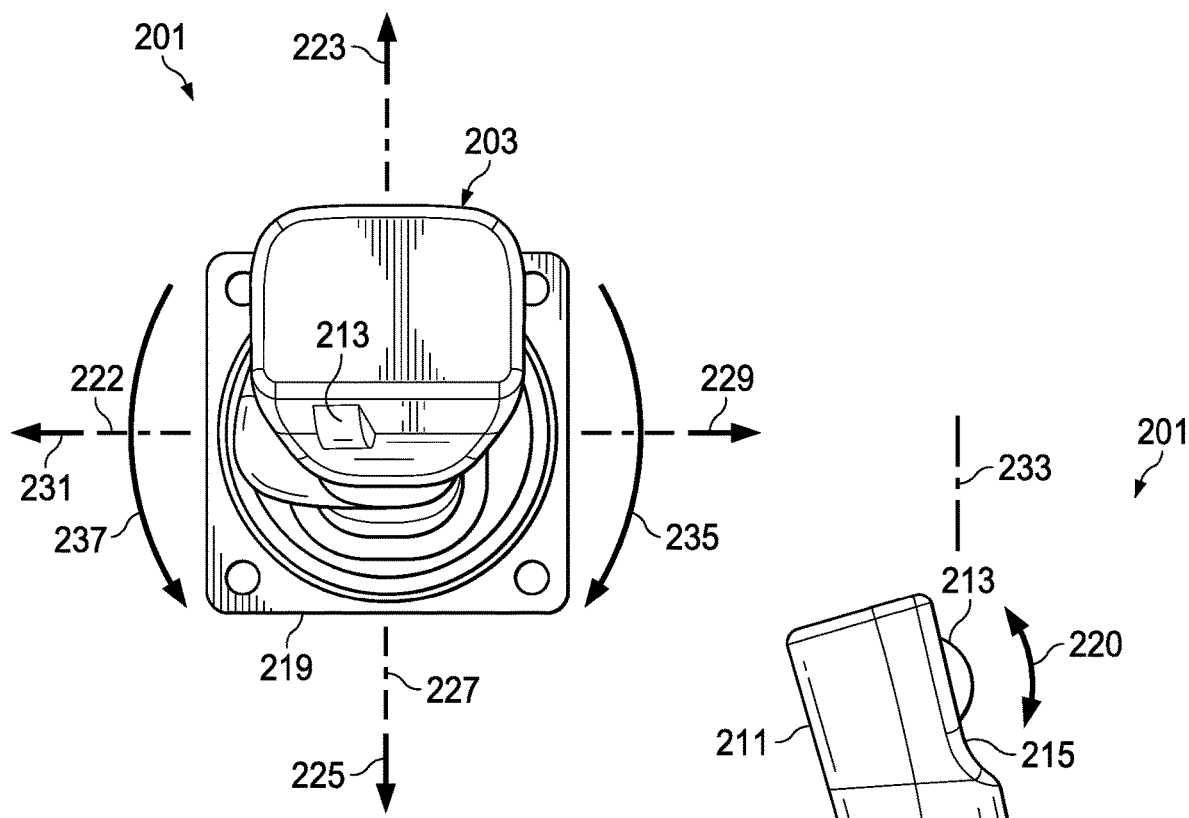
FIG. 4 is a top view of an aircraft control according to this disclosure.
Figure 5:
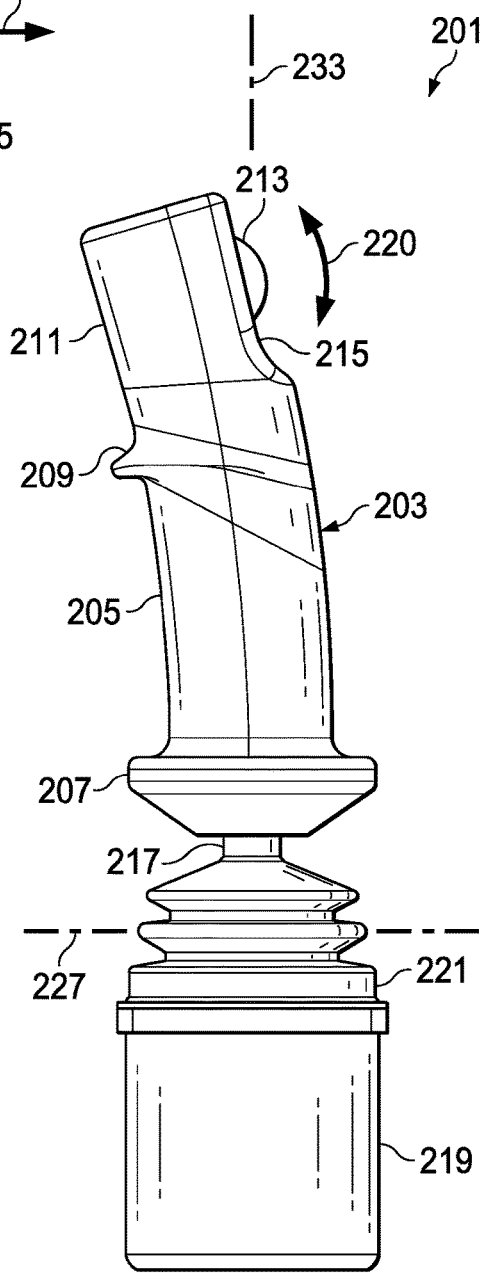
FIG. 5 is a side view of the aircraft control of FIG. 4.

Referring specifically to FIGS. 4 and 5, system 201 provides for operation of an aircraft with a helicopter model of controls, in which the thrust vector(s) generally points downward relative to the aircraft and rotates together with the aircraft during maneuvering. In this model, motion of stick 203 in right direction 229 about axis 227 causes the aircraft to roll to the right, whereas motion of stick 203 in left direction 231 about axis 227 causes the aircraft to roll to the left. Also in the helicopter model, motion of stick 203 in forward direction 223 about axis 222 causes the nose of the aircraft to pitch downward, whereas motion of stick 203 in rearward direction 225 about axis 222 causes the nose of the aircraft to pitch upward. Rotation of stick 203 in right direction 235 about axis 233 causes yawing of the aircraft to the right (the nose moves right by operation of, for example, a tail rotor), whereas rotation of stick 203 in left direction 237 about axis 233 causes yawing of the aircraft to the left (the nose moves left). An onboard flight-control system may be used to communicate the commands from the user to flight control devices, such as, for example, control surfaces and/or rotor blades, but the user is in control of pointing the thrust vector to achieve the desired direction and velocity of flight.

With the helicopter model of operation, at takeoff a user will increase thrust using thumbwheel 213 to gain altitude and then cause forward flight by pushing stick 203 forward to pitch the nose downward. Pulling stick 203 rearward causes the nose to pitch upward for climbing or to slow forward flight of the aircraft.

Figure 6:
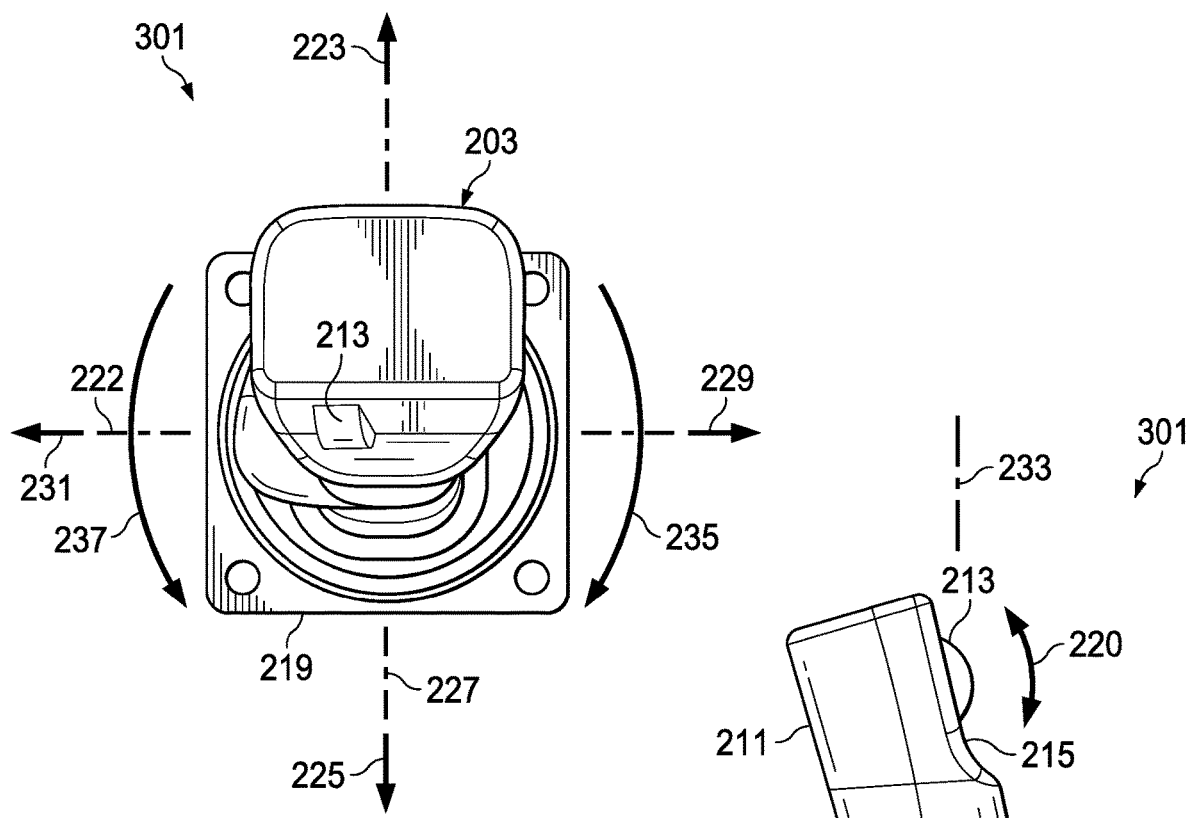
FIG. 6 is a top view of another embodiment of an aircraft control according to this disclosure.
Figure 7:
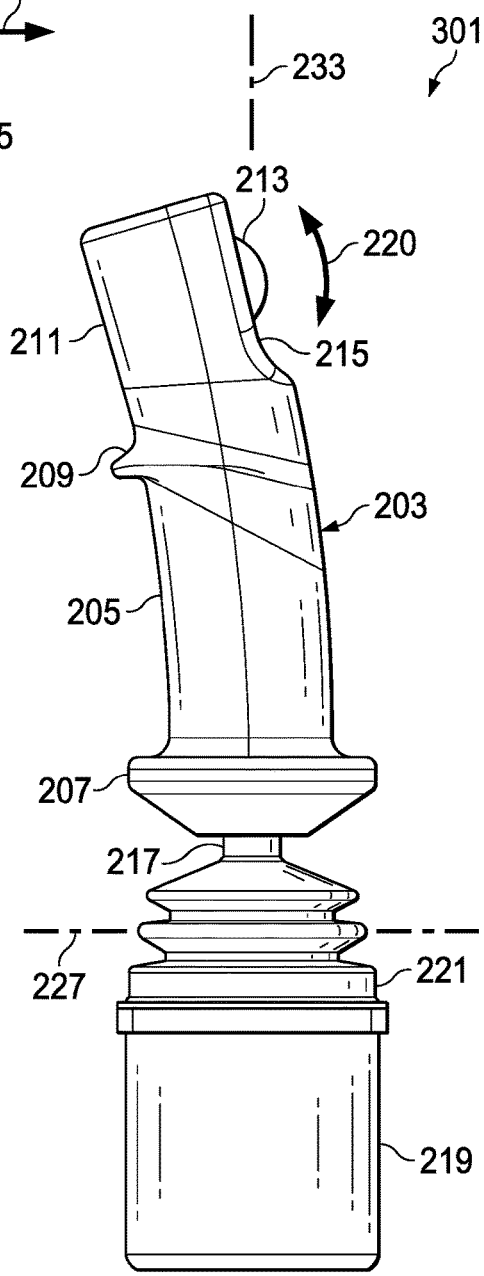
FIG. 7 is a side view of the aircraft control of FIG. 6.

Referring specifically to FIGS. 6 and 7, system 301 provides for operation of an aircraft with a simplified model of controls. This model can be used, for example, for a powered-lift aircraft having a thrust vector(s) rotatable relative to the aircraft during flight. In this model, motion of stick 203 in right direction 229 about axis 227 causes the aircraft to translate right, whereas motion of stick 203 in left direction 231 about axis 227 causes the aircraft to translate left, left and right translations being accomplished without the need for rolling the aircraft to reorient the thrust vector(s). Also in the simplified model, motion of stick 203 in forward direction 223 about axis 222 causes the aircraft to accelerate in the forward direction, whereas motion of stick 203 in rearward direction 225 about axis 222 causes the aircraft to accelerate in the rearward direction, forward and rearward acceleration being accomplished without the need for pitching the aircraft to reorient the thrust vector(s). Rotation of stick 203 in right direction 235 about axis 233 causes yawing of the aircraft to the right (the nose moves right), whereas rotation of stick 203 in left direction 237 about axis 233 causes yawing of the aircraft to the left (the nose moves left). An onboard flight-control system controls operation of flight control devices and/or thrust vector(s) to achieve the direction and velocity of flight commanded by the user.

With the simplified model of operation, at takeoff a user will increase thrust using thumbwheel 213 to control altitude and then cause forward flight by pushing stick 203 forward. Pulling stick 203 rearward causes a decrease in velocity of forward flight or rearward motion from a hover.

It should be noted that additional embodiments of the control systems of this disclosure can include the flight control system mixing power, thrust vectoring, and operation of control surfaces.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A control device for a powered-lift aircraft having a thrust vector pointing downward at takeoff, the control device comprising:

a control stick configured to be operated by a hand of a user, the control stick being pivotable about a longitudinal axis, a lateral axis, and a yawing axis extending through the control stick;

a thumbwheel carried by the control stick;

wherein motion of the stick about the longitudinal axis is configured to only reorient the thrust vector for causing lateral motion of the aircraft without rolling the aircraft;

wherein motion of the stick about the lateral axis is configured to only reorient the thrust vector for causing longitudinal motion of the aircraft without changing a pitch of the aircraft;

wherein motion of the stick about the yawing axis is configured to cause yaw motion of the aircraft; and wherein rotation of the thumbwheel is configured to only change a magnitude of the thrust vector.

2. The control device of claim 1, further comprising:

a rest configured to provide for friction between the rest and fingers of a user when the user grasps the control stick and assisting the user in causing motion of the stick about the yawing axis.

3. A method of controlling flight of a powered-lift aircraft having a thrust vector pointing downward at takeoff, the method comprising:

providing a control stick configured to be operated by a hand of a user, the control stick being pivotable about a longitudinal axis, a lateral axis, and a yawing axis extending through the control stick, the stick being coupled to flight control devices on the aircraft;

providing a thumbwheel carried on the stick;

moving the stick about the longitudinal axis to reorient the thrust vector for causing only lateral motion of the aircraft without rolling the aircraft;

moving the stick about the lateral axis to reorient the thrust vector for causing only longitudinal motion of the aircraft without changing a pitch of the aircraft;

moving the stick about the yawing axis to cause yaw motion of the aircraft; and rotating the thumbwheel to change only a magnitude of the thrust vector of the aircraft.

\* \* \* \* \*